(12) United States Patent
Latimer et al.

(10) Patent No.: US 10,087,730 B2
(45) Date of Patent: Oct. 2, 2018

(54) DIRECT STEAM GENERATOR DEGASSING

(71) Applicant: XDI Holdings, LLC, Bedford, NH (US)

(72) Inventors: Edward Latimer, Ponca City, OK (US); Chris Copeland, Calgary (CA); Michelle Fiedler, Bartlesville, OK (US); David Lamont, Calgary (CA)

(73) Assignee: XDI Holdings, LLC, Bedford, NH (US)

(*) Notice: Subject to any disclaimer, the term of this patent is extended or adjusted under 35 U.S.C. 154(b) by 257 days.

(21) Appl. No.: 14/625,883

(22) Filed: Feb. 19, 2015

(65) Prior Publication Data

US 2015/0369025 A1   Dec. 24, 2015

Related U.S. Application Data

(60) Provisional application No. 61/940,962, filed on Feb. 18, 2014.

(51) Int. Cl.
*E21B 43/24* (2006.01)
*B01D 19/00* (2006.01)
*B01D 5/00* (2006.01)

(52) U.S. Cl.
CPC ............ *E21B 43/24* (2013.01); *B01D 5/0069* (2013.01); *B01D 19/0068* (2013.01); *B01D 19/0073* (2013.01)

(58) Field of Classification Search
CPC ... E21B 43/24; B01D 5/0069; B01D 19/0073; B01D 19/0068
See application file for complete search history.

(56) References Cited

U.S. PATENT DOCUMENTS

2005/0241311 A1* 11/2005 Pronske .................... F01K 3/18
                                                  60/645
2010/0224363 A1*  9/2010 Anderson ........... E21B 43/2406
                                                  166/266

* cited by examiner

*Primary Examiner* — Brad Harcourt
(74) *Attorney, Agent, or Firm* — Dykema Gossett PLLC

(57) ABSTRACT

Systems and methods generate steam mixed with desired non-condensable gas concentrations using a direct steam generator. Injecting the steam into a reservoir may facilitate recovering hydrocarbons from the reservoir. Cooling an output of the direct steam generator produces water condensate, which is then separated from the non-condensable gas, such as carbon dioxide. Reducing pressure of the condensate subsequently heated by cross-exchange with effluent of the direct steam generator regenerates the steam with the carbon dioxide removed for the injection.

18 Claims, 1 Drawing Sheet

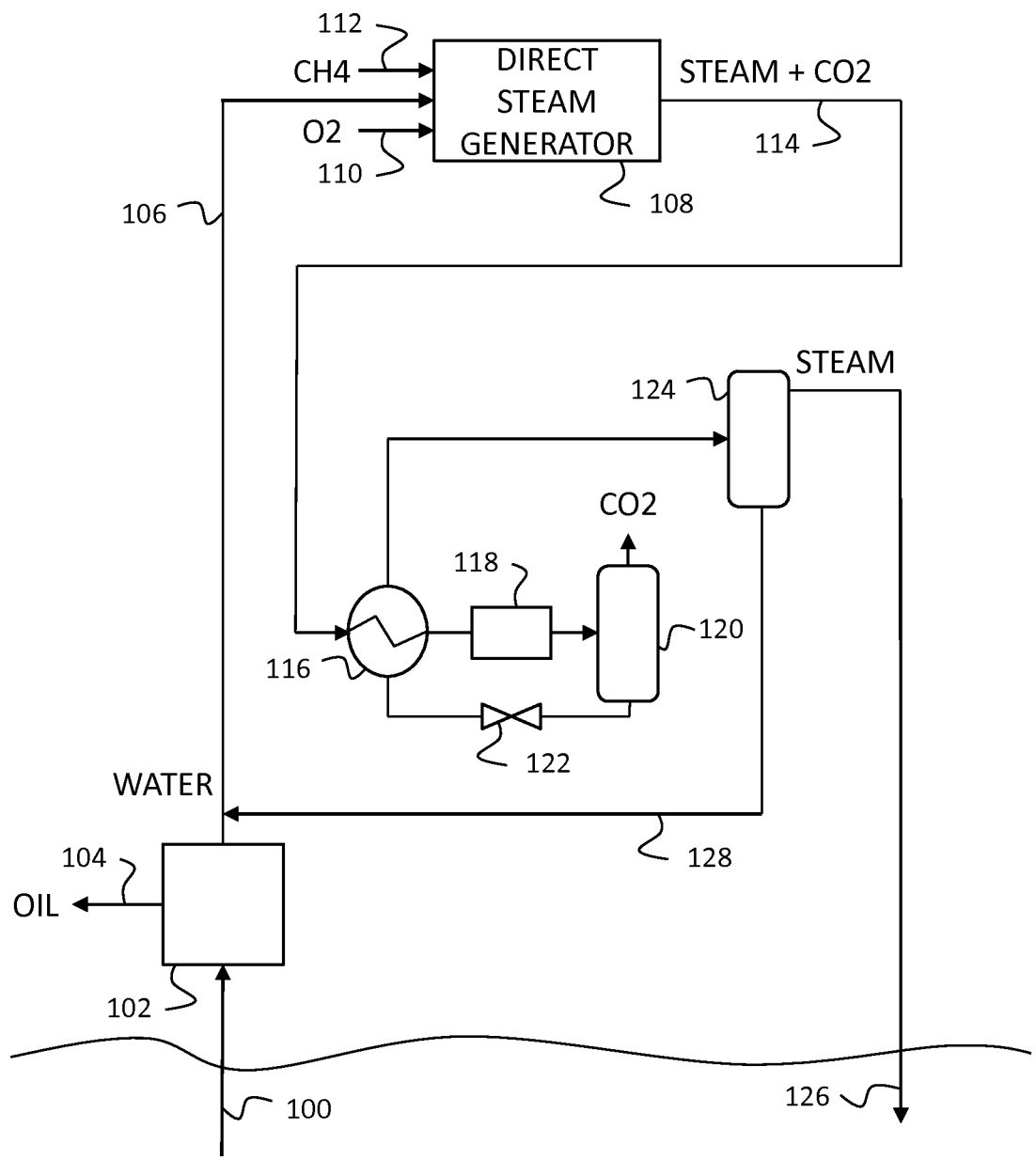

DIRECT STEAM GENERATOR DEGASSING

CROSS-REFERENCE TO RELATED APPLICATIONS

This application is a non-provisional application which claims benefit under 35 USC § 119(e) to U.S. Provisional Application Ser. No. 61/940,962 filed Feb. 18, 2014, entitled "DIRECT STEAM GENERATOR DEGASSING," which is incorporated herein in its entirety.

STATEMENT REGARDING FEDERALLY SPONSORED RESEARCH

None.

FIELD OF THE INVENTION

Embodiments of the invention relate generally to generating steam that may be utilized for injection in thermal oil recovery processes.

BACKGROUND OF THE INVENTION

Enhanced oil recovery processes employ thermal methods to improve recovery of heavy oils from subsurface reservoirs. For example, injection of steam into heavy oil bearing formations heats the oil in the reservoir, which reduces the viscosity of the oil and allows the oil to flow to a collection well. A mixture of the oil and produced water that flows to the collection well is recovered to the surface where the oil is separated from the water.

Different approaches exist for generating the steam. Prior once through steam generators (OTSGs) produce a wet steam by a single pass of water through a boiler isolated from fluid communication with combustion used to heat the boiler. An alternative approach utilizes a direct steam generator (DSG) to produce steam by contacting water with products from oxy-fuel combustion.

Effluent from the DSG thus includes carbon dioxide along with the steam from water vaporization and the combustion to limit water replenishing requirements. While some carbon dioxide injection may enhance hydrocarbon recovery and provide another advantage over the OTSG, excess carbon dioxide may cause an adverse impact on the recovery. The DSG can only provide a narrow range of carbon dioxide concentrations even though less or no carbon dioxide may be more effective.

Therefore, a need exists for systems and methods to generate steam with desired concentrations of carbon dioxide and that are more cost efficient.

BRIEF SUMMARY OF THE DISCLOSURE

In one embodiment, a method of recovering hydrocarbons with steam includes vaporizing water by direct contact of the water with combustion products to produce a resulting fluid including the steam and carbon dioxide. The method further includes cooling the fluid to provide a mixture of the carbon dioxide and water condensate, separating a gas phase with the carbon dioxide from a liquid phase with the condensate, and regenerating the steam by reducing pressure and then heating the condensate in a heat exchanger for thermal transfer with the fluid. Recovery of the hydrocarbons relies on injecting into a formation the steam with the carbon dioxide removed.

According to one embodiment, a system for recovering hydrocarbons with steam includes a steam generator in which water vaporizes by direct contact with combustion products to produce a resulting fluid including the steam and carbon dioxide. The system further includes a cooler coupled to receive the fluid from the steam generator for reducing temperature of the fluid to form a mixture of the carbon dioxide and water condensate, a separation vessel coupled to the cooler for removing a gas phase with the carbon dioxide from a liquid phase with the condensate and a pressure reducer coupled between an outlet for the condensate from the vessel and a heat exchanger forming at least part of the cooler to regenerate the steam at less pressure than the steam output from the steam generator using heat from the fluid output by the steam generator. At least one injection well couples to the pressure reducer for introducing into a formation the steam with the carbon dioxide removed.

For one embodiment, a method of degassing an output from direct steam generation includes vaporizing water by direct contact of the water with combustion products to produce a resulting fluid including steam and carbon dioxide. In addition, the method includes cooling the fluid in a heat exchanger and then a cooling unit to liquefy the steam into a water condensate at a first pressure and separating the carbon dioxide in a gaseous phase from the condensate. The steam regenerates at a second pressure lower than the first pressure by passing the condensate through a pressure reducer and then the heat exchanger for thermal transfer with the fluid.

BRIEF DESCRIPTION OF THE DRAWINGS

A more complete understanding of the present invention and benefits thereof may be acquired by referring to the following description taken in conjunction with the accompanying drawings in which:

FIG. 1 is a schematic of a system for degassing steam from a direct steam generator prior to injection into a hydrocarbon reservoir, according to one embodiment.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Embodiments of the invention relate to systems and methods of generating steam mixed with desired non-condensable gas concentrations using a direct steam generator. Recovering hydrocarbons from a reservoir may rely on injecting the steam into a reservoir. Cooling an output of the direct steam generator produces water condensate, which is then separated from the non-condensable gas, such as carbon dioxide. Reducing pressure of the condensate subsequently heated by cross-exchange with effluent of the direct steam generator regenerates the steam with the carbon dioxide removed for the injection.

FIG. 1 illustrates a system for recovering hydrocarbons that includes a processing unit 102, a direct steam generator or DSG 108, a cooler (e.g., a heat exchanger 116 and/or a cooling unit 118), a first separator 120, a pressure reducer 122 and a second separator 124 that are all coupled to at least one production well 100 and at least one injection well 126. In an exemplary embodiment, the injection well 126 and the production well 100 provide a well pair for a steam assisted gravity drainage (SAGD) operation. Various other recovery operations including cyclic steam stimulation, solvent aided SAGD and steam drive may also employ processes described herein.

In operation, the processing unit 102 receives a mixture that is recovered from the production well 100 and includes hydrocarbons or oil and condensate from steam that is injected to heat and mobilize the oil. The processing unit 102 may include liquid-gas separators, water-oil separators and treatment equipment for gas and water. The processing unit 102 separates the mixture into a sales stream 104 of the oil and a steam generator feed stream 106 of water.

The direct steam generator 108 burns fuel, such as produced gas, natural gas, methane, or combinations thereof, from fuel inlet 112, in oxygen within a combustor where the water from the feed stream 106 is also introduced. An air separation unit (ASU) output 110 may supply the oxygen to the direct steam generator 108. The oxygen plant may produce pure oxygen or may contain some impurities dependent upon the type of separation. Oxygen enriched air may be 25-50% oxygen, but typically purified oxygen is used with concentrations above 90%, preferably above 95%, and may even be above 97.5% to 99.5%. A fluid output 114 from the direct steam generator 108 thus conveys non-condensable gas products of combustion, such as carbon dioxide or other gases having a boiling point lower than conditions in the reservoir into which the steam is injected, along with steam from both water vaporization and the combustion to the heat exchanger 116.

In some embodiments, the DSG 108 superheats the steam in the output 114. The DSG 108 may include a solids removal device for filtering particulates caused by impurities in the water remaining once the water is vaporized. Alternative approaches may provide the steam at saturation or without complete vaporization such that wet steam passes to the heat exchanger 116 or is separated to provide saturated steam supplied to the heat exchanger 116.

The heat exchanger 116 cools the steam in the output 114 from the DSG 108 to condense at least some of the steam (e.g., at least ninety percent by weight) into water condensate. The cooling unit 118 further decreases temperature of the steam that remains after passing through the heat exchanger 116 to provide additional condensation. The use of cooling unit 118 provides additional cooling reducing the temperature change across heat exchanger 116 allowing a smaller heat exchanger to be used, but could increase the amount of steam losses via stream 128 because it is unlikely that all the water exiting the bottom of separator 120 could then be revaporized in exchanger 116. Thus there is a tradeoff between the cost of a smaller heat exchanger 116 and the increased steam losses via water in stream 128. The additional condensation attained from cooling unit 118. This additional condensation may cause all of the water to be in liquid phase upon exiting the cooling unit 118 and thus cause flow from the cooling unit to be at least eighty percent liquid by weight or between eighty-three and ninety-three percent liquid by weight.

Temperature and pressure conditions of outflow from the cooling unit 118 may be below the boiling point of water without need for further cooling and such that the non-condensable gases remain in the gaseous phase. In some embodiments, the cooling unit 118 relies on external heat dissipation such that thermal energy is transferred independent of fluid flows downstream from the DSG 108. The cooling unit 118 may utilize heat exchange with streams integrated in operations other than steam generation or employ fans for air based heat dissipation.

The outflow from the cooling unit 118 enters the first separator 120 where phase separation removes gases including the carbon dioxide from the water condensate. Steam entering the separator will exit with the carbon dioxide gas stream and represent a loss from the system, as will some of the finer water droplets because gas-liquid separators are not 100% efficient. The separator losses to steam can be minimized by including them in the optimization of cooler 118 discussed above, and the losses to water droplets can be minimized by good separator design. The carbon dioxide exits from an overhead of the first separator 120 and may be exhausted or conveyed to a sequestration site distinct from the formation into which the steam is desired for injection with limited or no carbon dioxide co-injection. The condensed water exiting a lower portion of the separator 120 passes through the pressure reducer 122.

For some embodiments, the pressure reducer 122 includes at least one of an orifice and a throttling valve. The condensate remains at a sufficient temperature such that this drop in pressure may flash part of the condensate to regenerate at least some of the steam, albeit degassed and at less pressure than the steam in the output 114 from the DSG. In one embodiment, the pressure reducer 122 reduces the pressure of the condensate by at least 6500 kilopascals (kPa) or at least 3500 kPa.

The DSG 108 in some embodiments provides the steam in the output 114 at a first pressure between 10,000 and 14,500 kPa and the steam that is injected into the formation is at a second pressure between 5500 and 10,000 kPa. Operating temperatures selected depend on these respective pressures and achieve phase changes as described herein. To obtain initial pressurization, pumps may supply the water to the DSG 108 at desired pressures.

This degassed stream or wet steam exiting the pressure reducer 122 passes through the heat exchanger 116, which vaporizes the water to steam as well as recovers heat due to thermal transfer upon cooling the steam from the output 114 of the DSG 108. The resulting degassed steam may feed into the second separator 124 for condensate removal prior to introduction into the injection well 126. The steam supplied to the injection well 126 may thereby contain limited or no carbon dioxide and be saturated. The condensate 128 from the second separator 124 may be recycled back to the feed stream 106 for supply to the DSG 108 or used elsewhere in the SAGD process integration.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims, while the description, abstract and drawings are not to be used to limit the scope of the invention. The invention is specifically intended to be as broad as the claims below and their equivalents.

The invention claimed is:

1. A method of recovering hydrocarbons with steam, comprising:
   vaporizing water by direct contact of the water with combustion products to produce a resulting fluid including the steam and carbon dioxide;
   cooling the fluid to provide a mixture of the carbon dioxide and water condensate;
   separating a gas phase with the carbon dioxide from a liquid phase with the condensate;
   regenerating the steam by reducing pressure and then heating the condensate in a heat exchanger for thermal transfer with the fluid;
   recycling to vaporize a liquid component that is separated from the steam following the reducing of the pressure and the heating in the heat exchanger; and
   injecting into a formation the steam with the carbon dioxide removed for recovery of the hydrocarbons.

2. The method of claim 1, wherein the cooling of the fluid includes passing the fluid through the heat exchanger and then passing the fluid through a cooling unit.

3. The method of claim 1, wherein the reducing of the pressure includes passing the condensate through at least one of an orifice and a throttling valve.

4. The method of claim 1, wherein the gas phase with the carbon dioxide is conveyed to a sequestration site distinct from the formation with the hydrocarbons.

5. The method of claim 1, wherein the fluid is at a first pressure between 10,000 and 14,500 kilopascals (kPa) and the steam that is injected into the formation is at a second pressure between 5500 and 10,000 kPa.

6. The method of claim 1, wherein the separating of the gas phase results in the steam that is injected having less than ten percent of the carbon dioxide from the fluid.

7. The method of claim 1, wherein the mixture of the carbon dioxide and the water condensate prior to separation is at least eighty percent liquid by weight.

8. The method of claim 1, wherein the mixture of the carbon dioxide and the water condensate prior to separation is between eighty-three and ninety-three percent liquid by weight.

9. The method of claim 1, wherein the vaporizing of the water provides the steam that is superheated.

10. A system for recovering hydrocarbons with steam, comprising:
    a steam generator in which water vaporizes by direct contact with combustion products to produce a resulting fluid including the steam and carbon dioxide;
    a cooler coupled to receive the fluid from the steam generator for reducing temperature of the fluid to form a mixture of the carbon dioxide and water condensate;
    a separation vessel coupled to the cooler for removing a gas phase with the carbon dioxide from a liquid phase with the condensate;
    a pressure reducer coupled between an outlet for the condensate from the vessel and a heat exchanger forming at least part of the cooler to regenerate the steam at less pressure than the steam output from the steam generator using heat from the fluid output by the steam generator;
    a recycle conduit coupled to supply the steam generator with a liquid component separated from the steam regenerated after the pressure reducer and the heat exchanger; and
    at least one injection well coupled to the pressure reducer for introducing into a formation the steam with the carbon dioxide removed.

11. The system of claim 10, wherein the cooler includes the heat exchanger and a cooling unit.

12. The system of claim 10, wherein the pressure reducer is at least one of an orifice and a throttling valve.

13. The system of claim 10, further comprising a sequestration site distinct from the formation with the hydrocarbons and where the gas phase with the carbon dioxide is conveyed.

14. The system of claim 10, wherein the steam generator operates at a first pressure between 10,000 and 14,500 kilopascals (kPa) and the pressure reducer is configured to provide the steam that is injected into the formation at a second pressure between 5500 and 10,000 kPa.

15. A method of degassing an output from direct steam generation, comprising:
    vaporizing water by direct contact of the water with combustion products to produce a resulting fluid including steam and carbon dioxide;
    cooling the fluid in a heat exchanger and then a cooling unit to liquefy the steam into a water condensate at a first pressure;
    separating the carbon dioxide in a gaseous phase from the condensate; and
    regenerating the steam at a second pressure lower than the first pressure by passing the condensate through a pressure reducer and then the heat exchanger for thermal transfer with the fluid;
    recycling to vaporize a liquid component that is separated from the steam after passing the condensate through the pressure reducer and the heat exchanger.

16. The method of claim 15, wherein the separating results in the steam at the second pressure having less than ten percent of the carbon dioxide from the fluid.

17. The method of claim 15, wherein a mixture of the carbon dioxide and the water condensate prior to the separating is between eighty-three and ninety-three percent liquid by weight.

18. The method of claim 15, wherein the pressure reducer is at least one of an orifice and a throttling valve.

* * * * *